(12) United States Patent
Patterson, II et al.

(10) Patent No.: US 8,370,183 B2
(45) Date of Patent: Feb. 5, 2013

(54) METHOD, PROGRAM, AND SYSTEM FOR CONDUCTING TRADE STUDIES AND EVALUATION ACTIVITIES

(75) Inventors: Curtis R. Patterson, II, Lake Park, FL (US); Martin D. Bennett, Loxahatchee, FL (US); William K. Barcza, Palm City, FL (US)

(73) Assignee: United Technologies Corporation, Hartford, CT (US)

( * ) Notice: Subject to any disclaimer, the term of this patent is extended or adjusted under 35 U.S.C. 154(b) by 1773 days.

(21) Appl. No.: 11/299,615

(22) Filed: Dec. 12, 2005

(65) Prior Publication Data

US 2007/0136124 A1 Jun. 14, 2007

(51) Int. Cl.
*G06Q 10/00* (2012.01)

(52) U.S. Cl. ..................................... 705/7.11
(58) Field of Classification Search .................. 705/7.11
See application file for complete search history.

(56) References Cited

U.S. PATENT DOCUMENTS

| | | | | |
|---|---|---|---|---|
| 5,550,746 | A * | 8/1996 | Jacobs | 700/231 |
| 5,794,220 | A * | 8/1998 | Hunt | 705/40 |
| 6,681,211 | B1 * | 1/2004 | Gatto | 705/36 R |
| 7,451,148 | B2 * | 11/2008 | Childress et al. | 1/1 |
| 2001/0027455 | A1 * | 10/2001 | Abulleil et al. | 707/102 |
| 2002/0055900 | A1 * | 5/2002 | Kansal | 705/37 |
| 2003/0069868 | A1 * | 4/2003 | Vos | 706/45 |
| 2003/0208514 | A1 * | 11/2003 | Yang et al. | 708/160 |

FOREIGN PATENT DOCUMENTS

JP 20041185552 A 4/2004

OTHER PUBLICATIONS

Saaty, Thomas L. "How to Make a Decision: The Analytic Hierarchy Process". Nov.-Dec. 1994. Interfaces. vol. 24, Issue 6. pp. 19-43.*
Forman, Ernest; Peniwait, Kirti. "Aggregating Individual Judgments and Priorities with the Analytic Hierarchy Process". 1998. European Journal of Operational Research. vol. 108. pp. 165-169.*
Dias, Luis; Costa, Joao Paulo; Climaco, Joao Namorado. "A Parallel Approach to the Analytic Hierarchy Process Decision Support Tool". 1995. Computing Systems in Engineering. vol. 6, Nos. 4/5. pp. 431-436.*
Bodin, Lawrence; Gass, Saul I.; "On Teaching the Analytic Hierarchy Process". 2003. Computers & Operations Research. vol. 30. pp. 1487-1497.*
Forman, Ernest H.; Gass, Saul I.; "The Analytic Hierarchy Process—An Exposition". Jul./Aug. 2001. Operations Research. vol. 49, No. 4. pp. 469-486.*
Barzilai, J.; "Deriving Weights from Pairwise Comparison Matrices". Dec. 1997. The Journal of the Operational Research Society. vol. 48, No. 12. pp. 1226-1232.*

(Continued)

*Primary Examiner* — Peter Choi
(74) *Attorney, Agent, or Firm* — Kinney & Lange, P.A.

(57) ABSTRACT

A comparative evaluation of a plurality of alternative candidates is performed by creating a plurality of evaluation criteria for evaluating the alternative candidates, comparing pairs of the evaluation criteria and assigning a relative weight to each compared pair of evaluation criteria, assigning an evaluation value to the evaluation criteria for each of the alternative candidates, and generating a relative ranking of the alternative candidates based at least in part on the assigned relative weights and the assigned evaluation values.

13 Claims, 12 Drawing Sheets

OTHER PUBLICATIONS

Barzilai, J.; "Deriving Weights from Pairwise Comparison Matrices". Dec. 1997. vol. 48, No. 12. pp. 1226-1232.*

Ulrich, Karl T.; Eppinger, Steven D. "Product Design and Development". 2000. Second Edition. Chapter 7, pp. 137-159.*

Wang, Ge.; "Product-Enabled Design and Evaluation of Manufacturing Supply Chain: An Integrated Multi-Criteria Decision-Based Methodology". Dec. 2001.*

Clive L. Dyn, "Rank Ordering Engineering Designs: Pairwise Comparison Charts and Borda Counts", 2002, pp. 236-242.

The Jun. 21, 2011 Office Action in related Japanese Patent Application No. 2007-001396.

Machine Translation of JP2004118552A.

* cited by examiner

128

| | | | |
|---|---|---|---|
| Rationale, Comments & Associated File | | | |
| Owner's Name: Curtis Doe | | Program: Sample | |
| Title: EXAMPLE ONLY - Surface Enhancement Patterns | | | |
| RATING LEVEL CRITERIA: | Safety | | |

RATING RATIONALE

Option 1: Dimples — Rating: 10

Option 2: Transverse Ribs — Rating: 8

Option 3: Cooled Ribs — Rating: 9

Option 4: Waffle — Rating: 8

COMMENTS

ASSOCIATED FILE ATTACHMENT

Manage File Link

Edit | Save | Undo Changes | Close

FIG. 11

Scoring Margins

Owner's Name: Curtis Doe  
Trade Study Title: EXAMPLE ONLY - Surface Enhancement Patterns  
Program: Sample  
Last Updated: 11/4/2005 2:45:18 PM Concept Evaluation & Selection Database Copy Form Image to Clipboard

| Criteria (Rating Level) | Weight Factor | Margin Over Least Favorable ||||
|---|---|---|---|---|---|
| | | Option 1 Dimples | Option 2 Tranverse Ribs | Option 3 Cooled Ribs | Option 4 Waffle |
| Safety | 16.01694915 | 0.321 | | 0.161 | |
| Reliability | 13.47457627 | 0.27 | 0.27 | 0.135 | |
| Maintainability | 11.77966102 | 0.235 | | 0.117 | 0.235 |
| Operational Cost | 7.542372881 | | 0.075 | 0.059 | 0.151 |
| Production Cost | 5.847457627 | 0.067 | 0.059 | 0.134 | |
| Development Cost | 6.694915254 | 0.185 | 0.067 | 0.185 | |
| Specific Impulse | 9.237288136 | | 0.093 | 0.117 | 0.117 |
| Thrust / Weight | 5.847457627 | | 0.059 | 0.101 | |
| Tech Maturity | 10.08474576 | 0.101 | 0.202 | 0.101 | |
| Program Risk | 13.47457627 | 0.135 | 0.27 | 0.135 | |
| | | 1.182 | 1.903 | 1.247 |

| Margin Over All ||||
|---|---|---|---|
| Option 1 Dimples | Option 2 Tranverse Ribs | Option 3 Cooled Ribs | Option 4 Waffle |
| 0.16 | | | |
| | | 0.067 | |
| | | | 0.076 |
| | 0.101 | | |
| | 0.135 | | |
| | | 0.656 | |

Footer Control    Close

FIG. 13

METHOD, PROGRAM, AND SYSTEM FOR CONDUCTING TRADE STUDIES AND EVALUATION ACTIVITIES

BACKGROUND OF THE INVENTION

The present invention relates to methods and systems for conducting trade studies. In particular, the present invention relates to methods and systems of conducting trade studies to compare alternative candidate designs, concepts, or ideas and to support decisions regarding the alternative candidates.

Trade studies are techniques used to provide support for decision making tasks in a variety of applications, such as design optimizations, marketing efforts, product characteristics, and economic qualities. For example, prior to launching a product, a company may conduct a trade study with test customers to evaluate which of multiple candidate products are preferred. The trade study allows the company to identify a preferred product, thereby reducing costs and increasing assurance of consumer acceptance of the preferred product.

Trade studies typically involve evaluating alternative candidates based on identified criteria, and then comparing the evaluated criteria to prioritize the alternative candidates (e.g., selecting an optimal candidate based on the evaluated criteria). This provides a level of assurance to the decision maker that the choice between the alternative candidates was made based on objective data.

A common issue with trade studies is the large volumes of complex data used during the evaluation process. A given trade study may, for example, include twenty alternative candidates to compare, and fifteen evaluation criteria to apply to each alternative candidate. This may result in calculation errors and/or an undesired reduction in the number of important evaluation criteria, which can produce errors in the overall study.

Another issue with trade studies is the inclusion of user bias in the evaluation of the alternative candidates. User bias tends to reduce the objectivity and balanced nature of the trade studies in question, thereby reducing the objectiveness of the trade study results. This accordingly may reduce the reliability of such studies when used to support decisions between alternative candidates.

BRIEF SUMMARY OF THE INVENTION

The present invention is a method, program, and system for performing a comparative evaluation of a plurality of alternative candidates. A plurality of evaluation criteria are created for evaluating the alternative candidates, pairs of the evaluation criteria are compared, and a relative weight is assigned to each compared pair of evaluation criteria. An evaluation value is assigned to the evaluation criteria for each of the alternative candidates and a relative ranking of the alternative candidates is generated based at least in part on the assigned relative weights and the assigned evaluation values.

BRIEF DESCRIPTION OF THE DRAWINGS

FIGS. 2-13 are screen shots of display modules of a computer program that is suitable for conducting trade studies pursuant to the method of the present invention.

DETAILED DESCRIPTION

Figure 1:
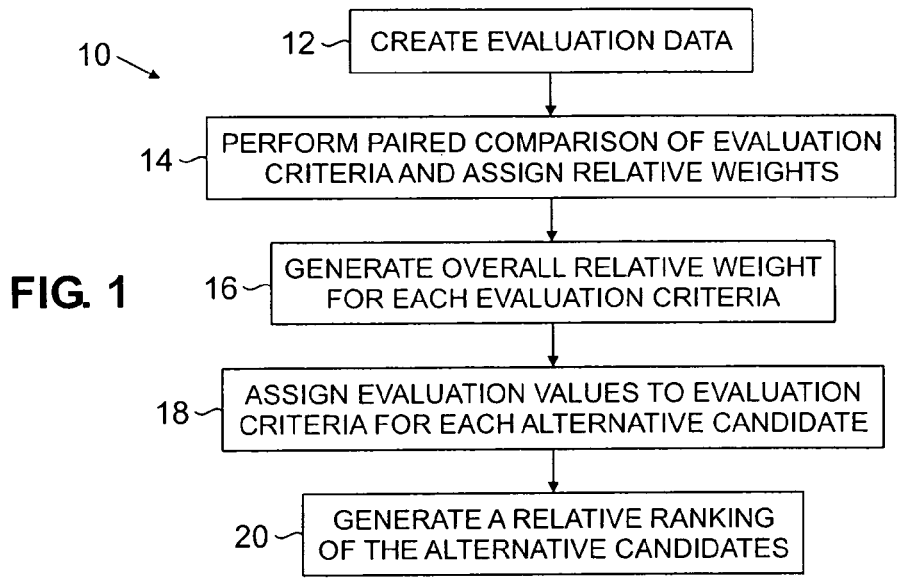
FIG. 1 is a block diagram of a method for conducting trade studies pursuant to the present invention.

FIG. 1 is a block diagram of method 10 for conducting a trade study in a systematic manner. As shown, method 10 includes steps 12-20, which allow a user to compare and evaluate a plurality of alternative candidates. Candidates that may be evaluated with method 10 include any type of design, idea, or concept that one or more evaluation criteria may be applied to. Examples of suitable candidates include product and engineering designs, services, consumer goods, and the like.

Method 10 initially involves creating one or more evaluation criteria, which are qualitative or quantitative factors to be evaluated for each alternative candidate (step 12). For example, a trade study regarding a new product may use evaluation criteria such as cost, reliability, and safety. The user may select evaluation criteria based on input from a variety of sources, such as design variations, economic constraints, mission requirements, and consumer collaboration.

Additionally, the created evaluation criteria may include multiple tiers of criteria. Preferably, the evaluation criteria includes a plurality of top level criteria, and at least one sublevel criteria for each top level criteria. For example, a top level criteria may be "cost", which may include sublevel criteria of "development cost", "manufacturing cost", "packaging cost", and "marketing cost".

Once created, the user may compare each evaluation criteria to each of the others, and assign relative weights (step 14). This step preferably involves a paired comparison of the evaluation criteria, which is an analytical hierarchal technique that involves comparing at least two of the evaluation criteria and assigning a relative weight between them. This is desirably repeated until all of the evaluation criteria are compared to each other, and have assigned relative weights with respect to each other. The relative weight between each pair of evaluation criteria allows the user to prioritize the importance of each of the evaluation criteria.

When the paired comparison is complete, the user may then generate overall relative weights for the evaluation criteria based on the assigned relative weights (step 16). The overall relative weight for each evaluation criteria is calculated as a function of the relative weights assigned to all of the evaluation criteria. This provides the user with an overall comparison of the importance of the evaluation criteria.

Generating the overall relative weights of the evaluation criteria based on the relative weights assigned with the paired comparison technique adds a level of redundancy in the process. In contrast, if a user assigns relative weights to evaluation criteria based on a direct overall comparison of the evaluation criteria, the user may undesirably assign elevated weights to one or more evaluation criteria because of personal bias or beliefs. The paired comparison technique, however, balances the assignment of the relative weights over multiple comparisons. This reduces the risk of user bias, thereby increasing the consistency of the relative weight assignments.

The alternative candidates may then be evaluated based on the evaluation criteria, which may be performed with test participants at any time after the evaluation criteria are created in step 12. For each alternative candidate, a given participant may assign an evaluation value (e.g., a ranking from 1 to 10) for each evaluation criteria (step 18). For example, if a participant is evaluating alternative candidates based on an evaluation criteria of "safety", the participant may assign an evaluation value of "3" to a first candidate and an evaluation value of "5" to a second candidate, where the given participant believes that the second candidate is moderately safer than the first candidate. The evaluation values may also be based on quantitative results, such as monetary costs, product life spans, chemical analysis results, and physical property results.

When the relative weights and evaluation values are assigned, the user may then generate a relative ranking of the alternative candidates (step 20). The relative ranking of the alternative candidates is desirably based at least in part on the relative weights assigned to the compared evaluation criteria in step 14, and the evaluation values assigned in step 18. In one embodiment, the relative ranking of the alternative candidates is based at least in part on the overall relative weights of the evaluation criteria, generated in step 16, and the evaluation values assigned in step 18. The relative ranking may then be analyzed and used to support decisions regarding the alternative candidates.

Method 10 provides a disciplined approach to evaluate alternative candidates with complex data volumes, and which reduces the risk of user bias. This improves the consistency of test study results obtained from method 10, which correspondingly reinforces confidence that the trade study is robust and reliable. While method 10 is discussed above as being performed by a "user", the term "user" may refer to one or more persons or entities, and may be performed with the use of trade study tools, such as a computer program discussed below in FIGS. 2-14.

FIGS. 2-13 are screen shots of various display modules of "Concept Evaluation and Selection Database" (CESD) program 22, where CESD program 22 is an example of suitable software used with a host computer for conducting trade studies pursuant to method 10 of the present invention. As discussed further below, CESD program 22 is capable of retaining a complete record of a given trade study, thereby allowing a user to have highly-detailed documentation to support resulting decisions.

Figure 2:
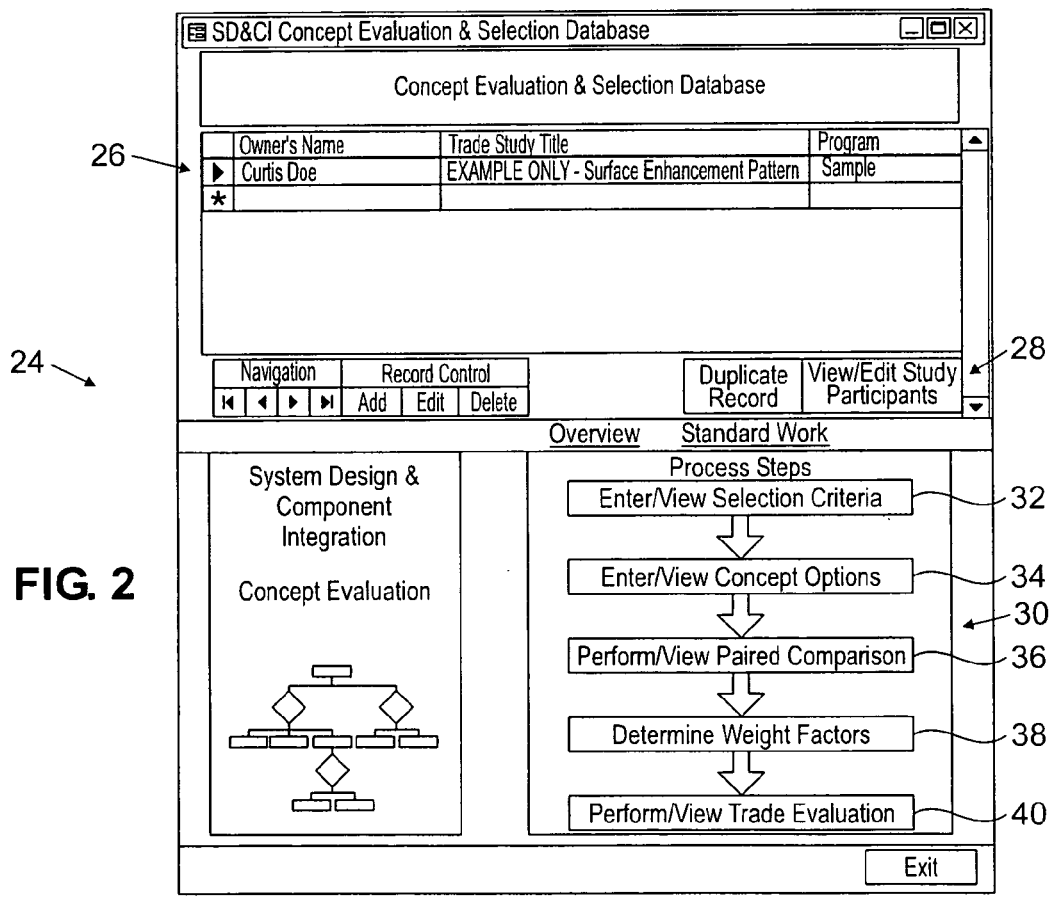

FIG. 2 shows introduction module 24 of CESD program 22, which is a user-friendly interface that allows a user to access various portions of program 22 for conducting a trade study pursuant to method 10. Introduction module 24 includes file access menu 26, participant list button 28, and process steps menu 30. File access menu 26 allows a user to create a new trade study file or access a previously created trade study file. As shown, file access menu 26 provides the user name "Curtis Doe", the trade study title "Surface Enhancement Pattern", and general information about the trade study file (e.g., sample program).

Participant list button 28 allows the user to view, add, and edit the participants in the trade study that will evaluate the alternative candidates and assign evaluation values for each of the evaluation criteria. As discussed below, participant list button 28 opens a separate display module to access information about the participants.

Process step menu 30 is the portion of introduction module 24 where the user may use CESD program 22 to conduct a trade study pursuant to method 10. Process steps menu 30 includes selection criteria button 32, concept options button 34, paired comparison button 36, weight factors button 38, and trade evaluation button 40. After creating or accessing a trade study file (e.g., "Surface Enhancement Patterns") and assigning the participants, the user may sequentially step through method 10 with process step menu 30 to enter and analyze information relating to the trade study.

Figure 3:
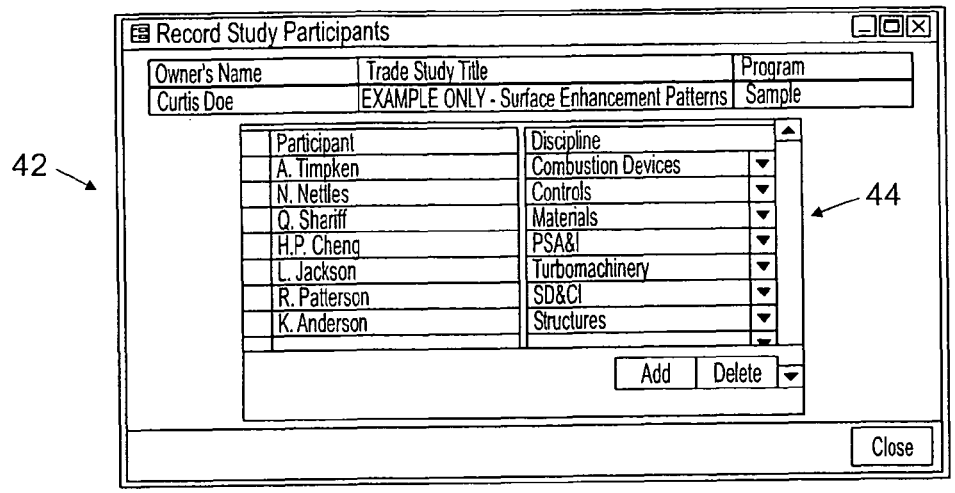

FIG. 3 shows participant list module 42, which is a display module that opens when the user selects participant list button 28 of introduction module 24. Participant list module 42 includes participant menu 44, which allows the user to add and remove participants of the trade study. The user may enter as many participants as the user desires to assist in the trade study, and may subsequently use participant list module 42 to edit or remove participants. Participant menu 44 also allows the user to record the discipline of each participant, thereby allowing the user to identify the different skills and backgrounds of each participant.

Figure 4:
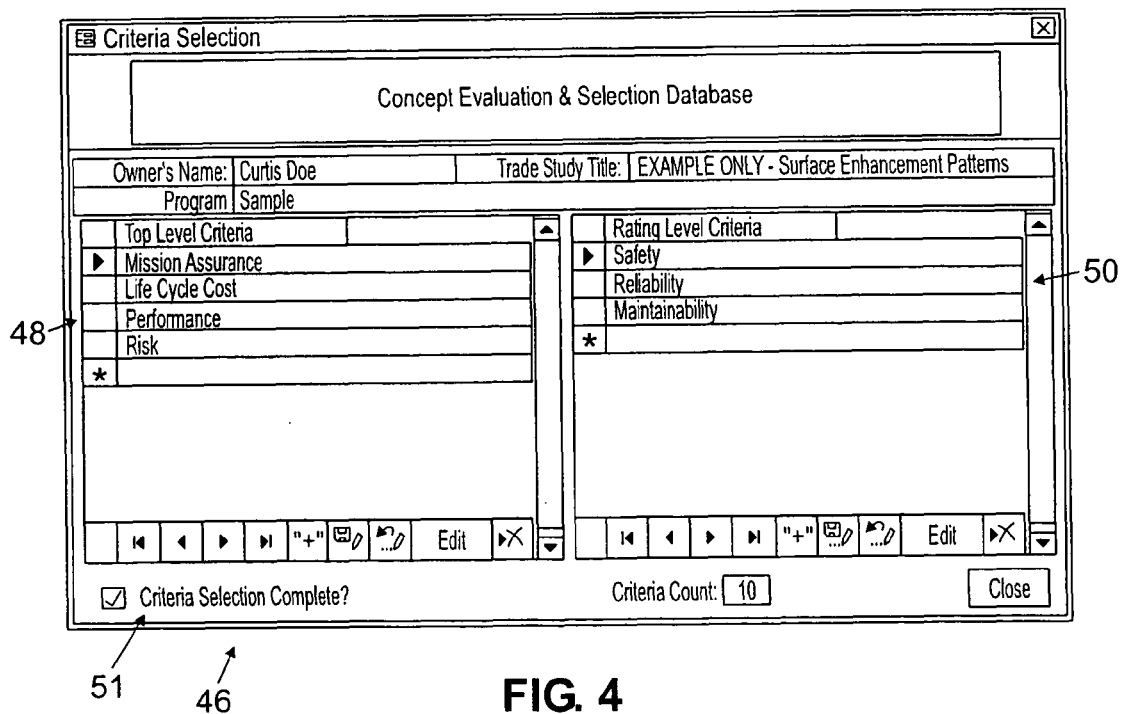

FIG. 4 shows criteria selection module 46, which is a display module that opens when the user selects selection criteria button 32 of introduction module 24. Criteria selection module 32 is the portion of CESD program 22 where the user may enter the evaluation criteria (pursuant to step 12 of method 10) that will be used by the participants to evaluate the alternative candidates. Criteria selection module 32 includes top level menu 48 and sublevel menu 50, which allows the user to enter the evaluation criteria in a two-tier arrangement. The user may initially use top level menu 48 to enter top level criteria, which are broad criteria categories for evaluating the alternative candidates (the alternative candidate "surface enhancement patterns", in this example).

The user may then use sublevel menu 50 to enter at least one sublevel criteria for each top level criteria. For example, as shown in FIG. 4, the user may enter a top level criteria entitled "Mission Assurance" and then enter sublevel criteria entitled "Safety", "Reliability", and "Maintainability". The sublevel criteria may then be used by the participants to evaluate the alternative candidates. As generally shown throughout the display modules of CESD program 22, the sublevel criteria are listed as "rating level criteria". This label is used by CESD program 22 because the sublevel criteria are the criteria that are rated by the participants while evaluating the alternative candidates.

As further shown in FIG. 4, criteria selection module 46 also includes completion check box 51, which is located in the lower left corner and is labeled "Criteria Selection Complete". Completion check box 51 is a safety measure that requires the user to proceed through CESD program 22 in the order shown listed process steps menu 30 of introduction module 24, shown in FIG. 2. Accordingly, before the user may proceed to a next step along process steps menu 30, the user must check completion check box 51.

Figure 5:
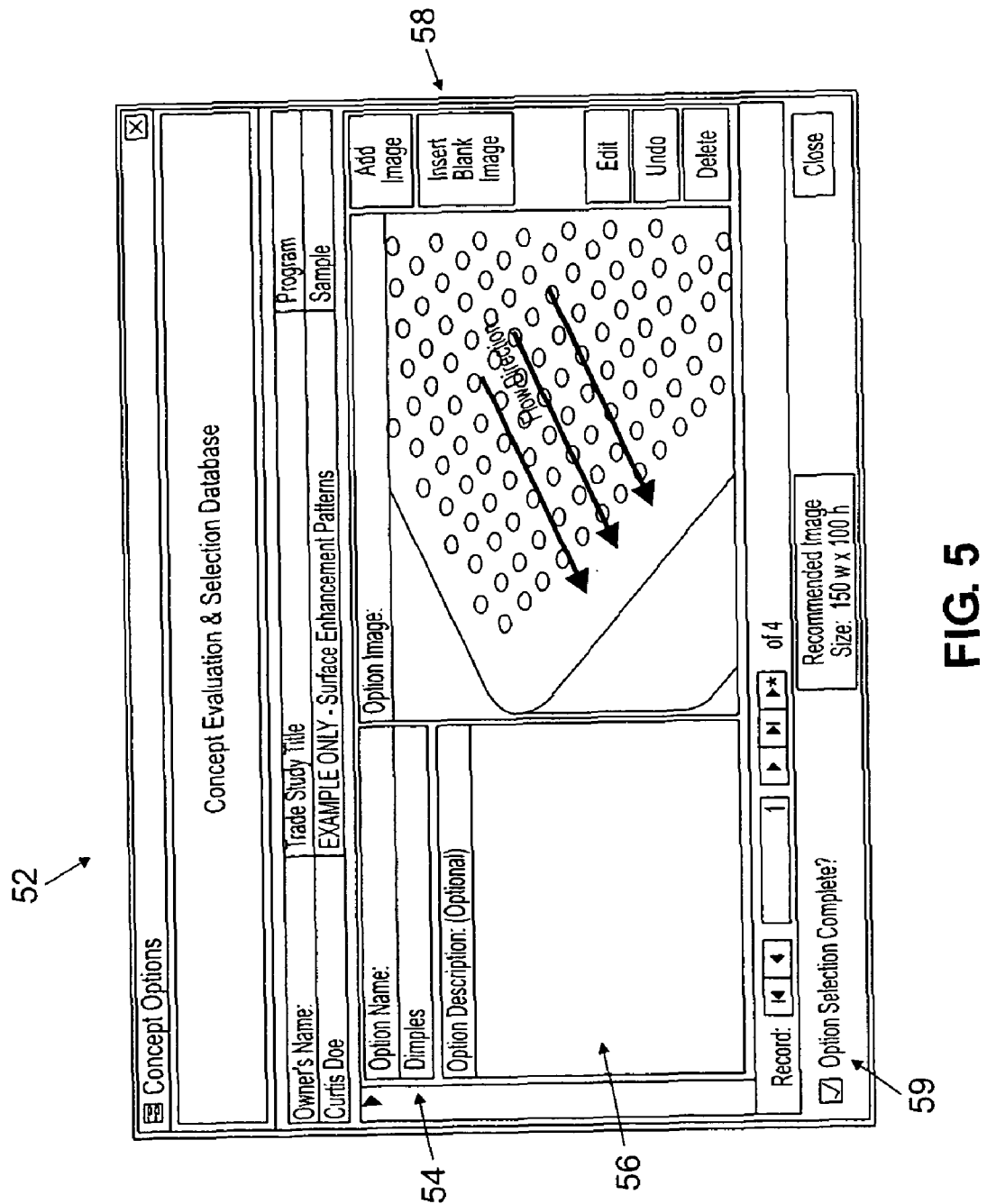

FIG. 5 shows concept options module 52, which is a display module that opens when the user selects concept options button 34 on introduction module 24. Concept options module 52 allows the user to identify and describe the alternative candidates, and includes candidate name box 54, candidate description box 56, candidate image section 58, and completion check box 59. The user may enter the name of a given candidate (e.g., "Dimples") in candidate name box 54 and provide a written description about the candidate in candidate description box 56. Additionally, the user may provide one or more images of the candidate in image section 58. The entered information supplements the information recorded by CESD program 22, and further increases the documentation that the user may rely on when making a decision based on the trade study. Completion check box 59 requires the user to proceed through. CESD program 22 in the given order, and functions in the same manner as completion check box 51 of criteria selection module 46.

Figure 6:
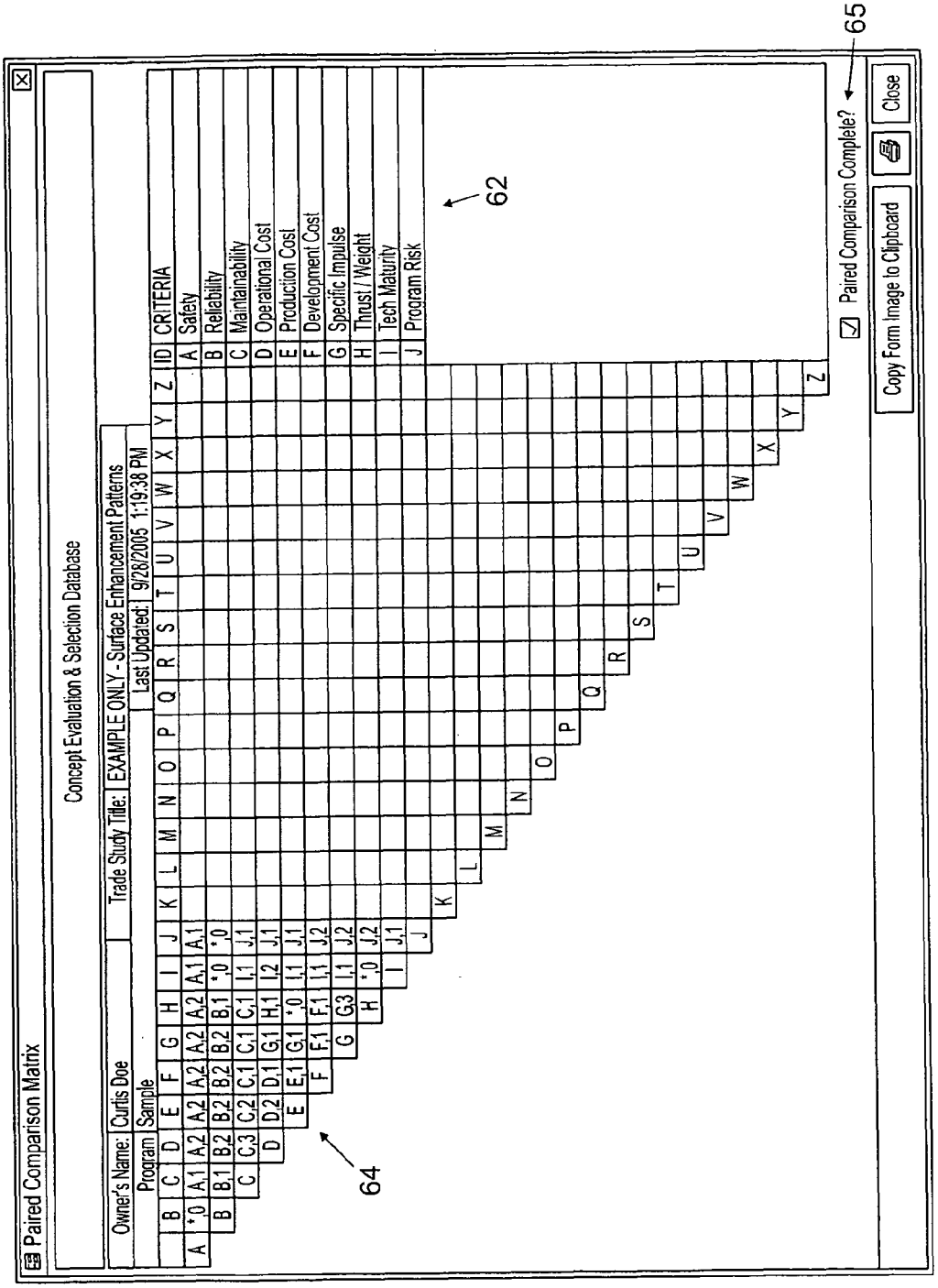

FIG. 6 shows paired comparison module 60, which is a display module that opens when the user selects paired comparison button 36 of introduction module 24. Paired comparison module 60 includes criteria list 62, comparison table 64, and completion check box 65. Criteria list 62 is a generated list of all of the sublevel criteria that were entered in rating level criteria menu 50 of criteria selection module 46. The sublevel criteria are also provided with identification letters (e.g., A-J), which are used in comparison table 64.

Comparison table 64 allows the user to perform a paired comparison of the sublevel criteria, pursuant to step 14 of method 10. Comparison table 64 lists the identification letters of the sublevel criteria along horizontal rows and vertical columns to provide a paired match-up of each sublevel criteria. The user may select a given cell within comparison table 64 to assign and enter a "relative weight" between a pair of sublevel criteria. The relative weights may be listed as integer numerals, and may range from no relative weight (i.e., the compared pair of sublevel criteria have equal weights) to high relative weights (i.e., one of the pair of sublevel criteria is of greater importance relative to the other of the pair).

The relative weights may range from 0-3 for each of the sublevel evaluation criteria, where "0" is no relative weight, "1" is a low relative weight, "2" is a medium relative weight, and "3" is a high relative weight. For example, as shown in FIG. 6, the user has entered "C,1" in the cell intersecting row C and column F, which respectively refer to sublevel criteria entitled "Maintainability" and "Development cost". The relative weight "C,1" corresponds to the user holding "Maintainability" to be slightly more important than "Development cost". Alternatively, if the user had entered "F,1" instead of "C,1", "Development cost" would have slightly more weight than "Maintainability". The user desirably uses comparison table 64 to assign a relative weight between each pair of sublevel criteria. As discussed above, the paired comparison obtained with comparison table 64 reduces the risk of user bias by adding a level of redundancy when comparing the sublevel criteria.

Completion check box 59 is also a safety measure that requires the user to proceed through CESD program 22 in the order shown listed process steps menu 30 of introduction module 24, shown in FIG. 2. Completion check box 59 functions in the same manner as completion check box 59 of concept options module 52.

Figure 7:
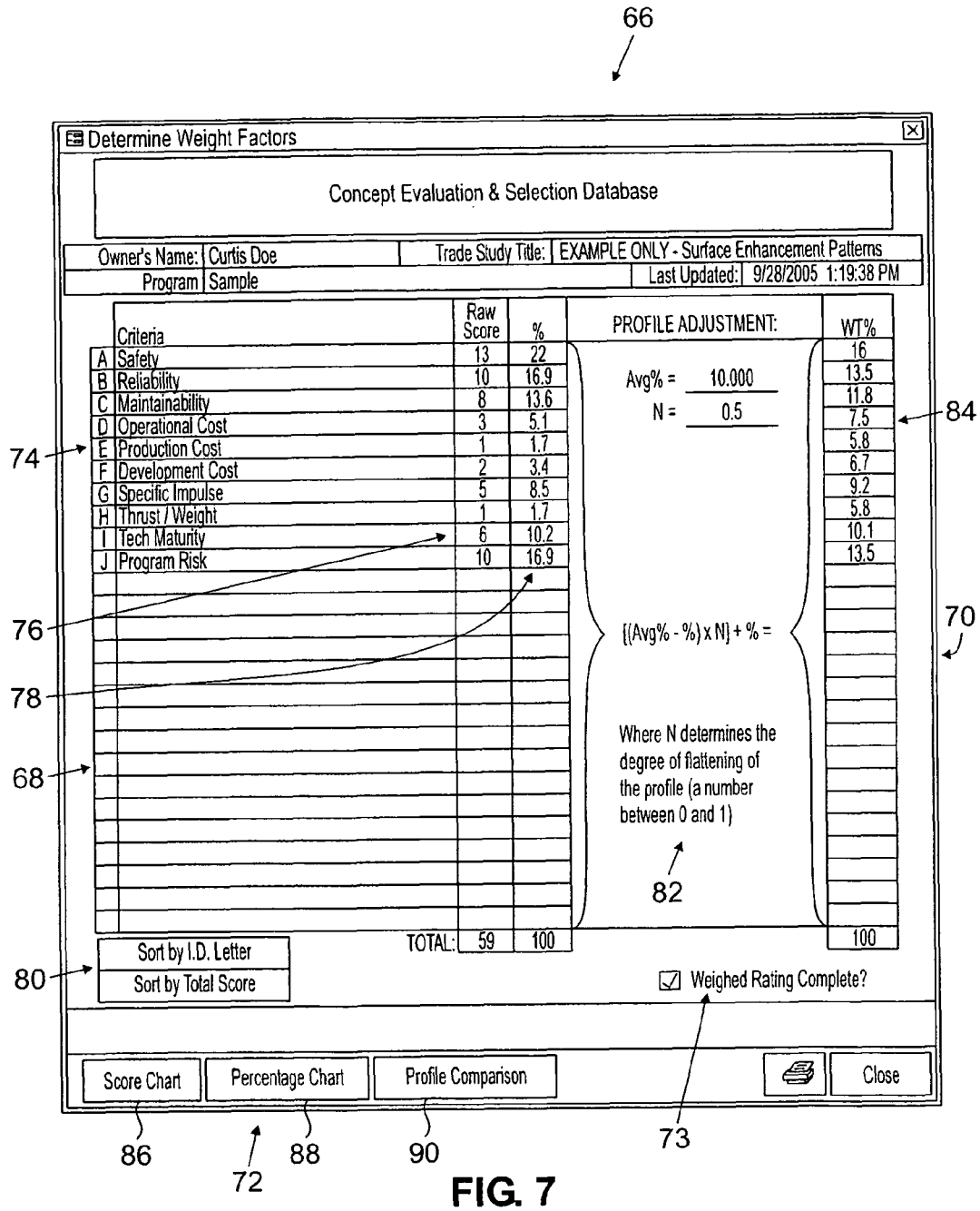

FIG. 7 shows weight factor module 66, which is a display module that opens when the user selects weight factors button 38 of introduction module 24. Weight factor module 66 includes generated listings section 68, profile adjustment section 70, graphical representation section 72, and completion check box 73. Generated listings section 68 includes criteria list 74, raw score list 76, raw percentage list 78, and sort buttons 80.

Criteria list 74 is a generated list of the sublevel criteria and identification letters, which corresponds to criteria list 62 of paired comparison module 60. Raw score list 76 is a calculated list of overall relative weights for the sublevel criteria, which is generated by the host computer pursuant to step 16 of method 10. The host computer generates an "overall relative weight" for each sublevel criteria based on the relative weights assigned to the sublevel criteria in comparison table 64 of paired comparison module 60. This generally involves an iterative or recursive computation of all of the assigned relative weights of the sublevel criteria. Raw percentage list 78 correspondingly presents the overall relative weights of the sublevel criteria as percentages. The overall relative weights and respective percentages shown respectively in raw score list 76 and raw percentage list 78 allow the user to compare the relative importance of the sublevel criteria. As discussed above, the overall relative weights have reduced user bias because of the paired comparison technique used.

Sort toggle buttons 80 are a pair of buttons that allow the user to switch the sorting of the sublevel criteria based on either the identification letters or the overall relative weights provided in raw score list 76. This is particularly beneficial when conducting a trade study with a large number of sublevel criteria.

Profile adjustment section 70 of weight factor module 66 is a component of CESD program 22 that allows the user to adjust the overall relative weights of the sublevel criteria. As shown, profile adjustment section 70 includes adjustment entry box 82 and adjusted percentage list 84. Adjustment entry box 82 allows the user to enter a flattening factor "N", which is a numerical value ranging from "0" to "1" for flattening the overall relative weights of the sublevel criteria. The flattening brings the overall relative weights of the sublevel criteria closer together toward an average value, and is represented by the following equation:

$$\text{Adjusted \%} = [(\text{Average \%} - \text{Raw \%}) \times N] + \text{Raw \%}$$

"Adjusted %" is the resulting percentage of overall relative weight after the flattening, and is listed in adjusted percentage list 84. "Average %" is the average of the percentages provided in raw percentage list 78, "Raw %" is the percentage of a given sublevel criteria as listed in raw percentage list 78, and "N" is the flattening factor, as discussed above. The flattening of the overall relative weights provides the user a degree of freedom with the trade study parameters by reducing the degree of contrast between the overall relative weights (i.e., reducing the dominant effects that the extreme values have on the trade study).

Graphical representation section 72 includes score chart button 86, percentage chart button 88, and profile comparison button 90. Graphical representation section 72 allows the user to analyze graphical representations of the data provided in weight factor module 66, as discussed below. Completion check box 73 is located in the lower right corner of weight factor module 66, and functions in the same manner as completion check box 65 of paired comparison module 60.

Figure 8:
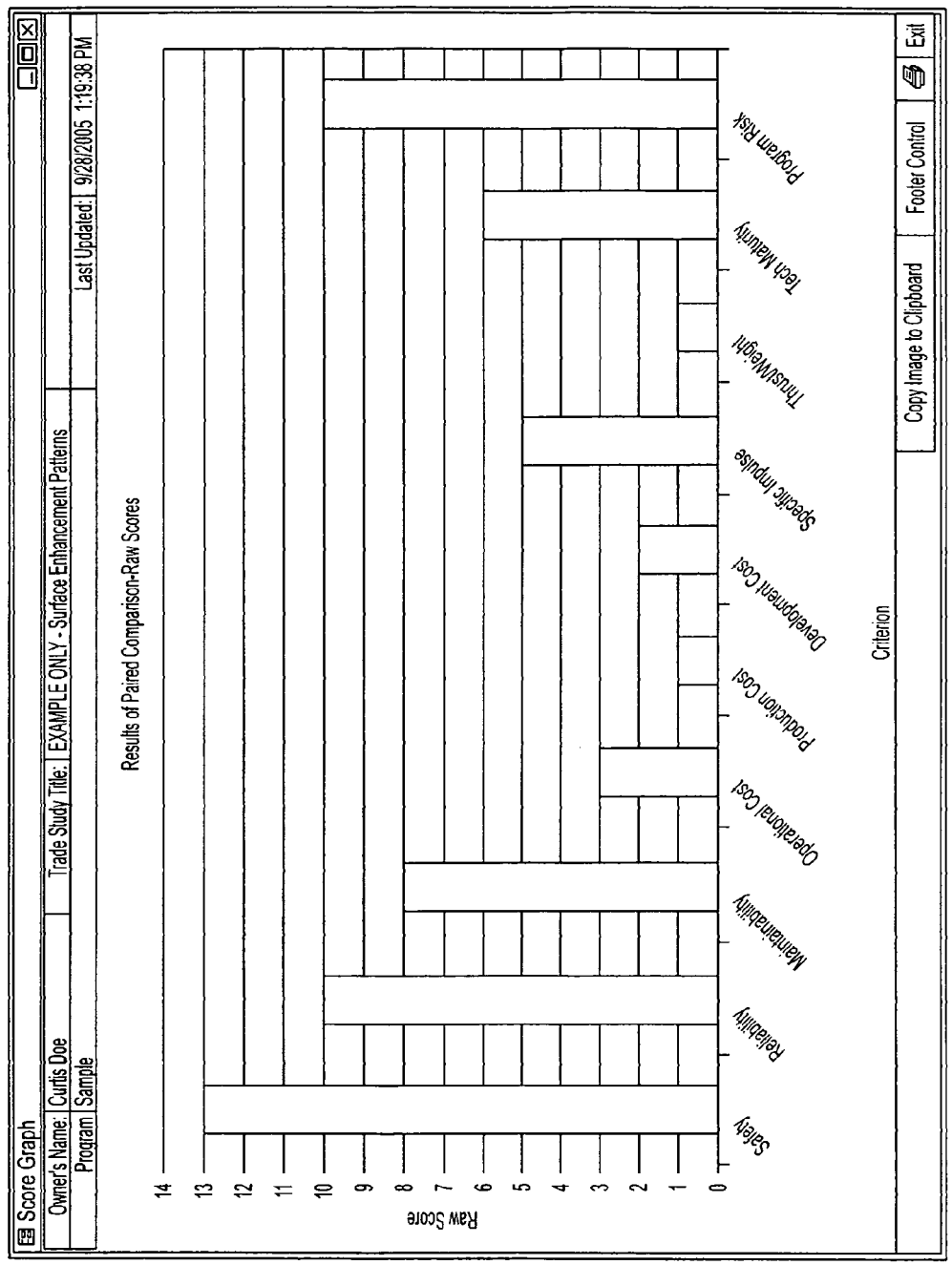

FIG. 8 shows score factor module 92, which is a display module that opens when the user selects score chart button 86 of weight factor module 66. As shown, score factor module 92 provides a graphical representation of the overall relative weights of the sublevel criteria as provided in raw score list 76. Similarly, the user may open a corresponding percentage chart module 93 (not shown in FIG. 8) by selecting percentage chart button 88 on weight factor module 66. The percentage chart module provides a graphical representation of the percentages of overall relative weights of the sublevel criteria as provided in raw percentage list 78. These modules may be used to assist the user in determining whether to manually adjust the overall relative weights of the sublevel criteria, as discussed above.

Figure 9:
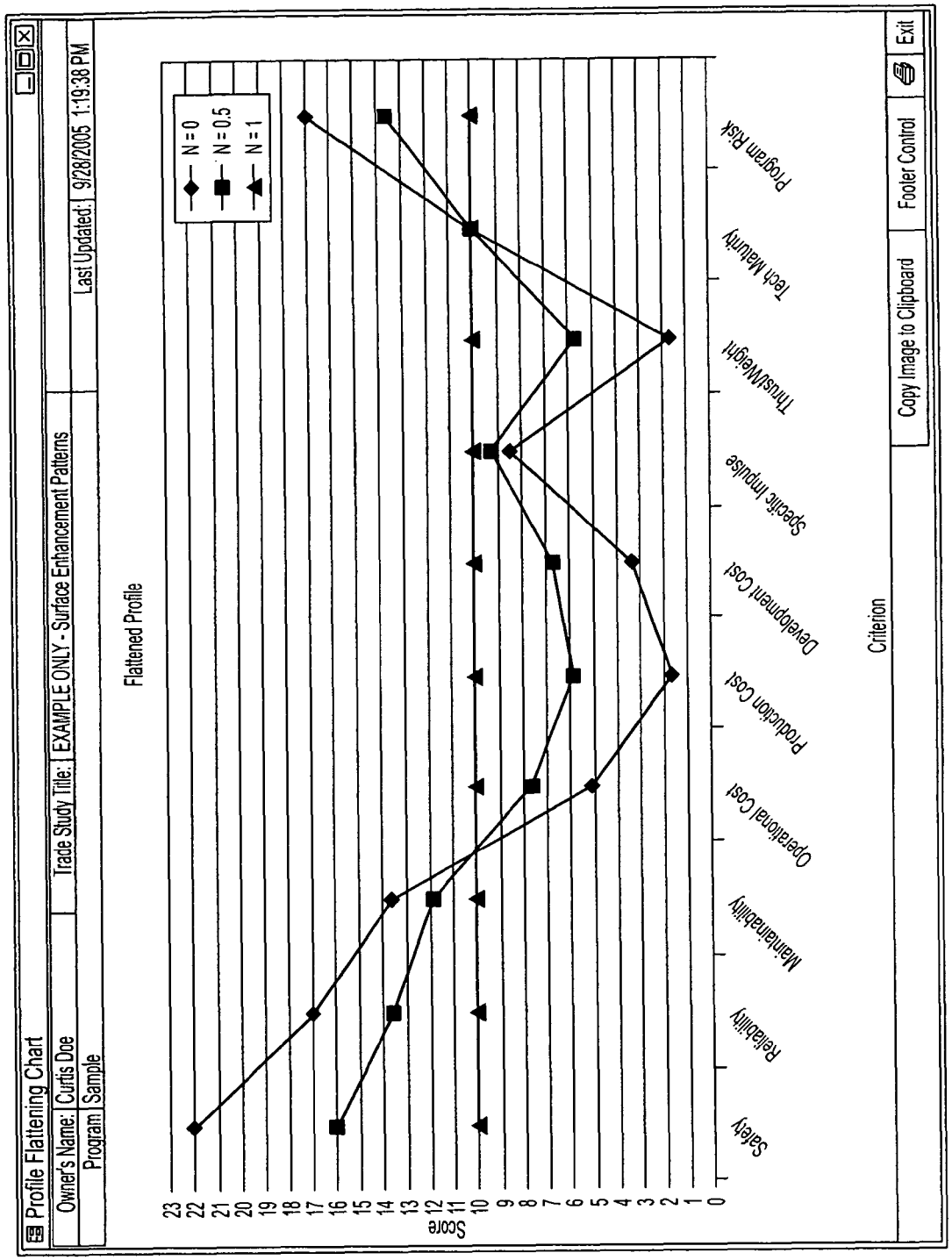

FIG. 9 shows profile flattening module 94, which is a display module that opens when the user selects profile comparison button 90 on weight factor module 66. Profile flattening module 94 provides a graphical representation of the effects of the flattening factor "N" used in profile adjustment section 70. As shown, when N=0, the overall relative weights of the sublevel evaluation criteria are unchanged. However, when N=0.5, the overall relative weights are flattened toward an average value of the overall relative weights. Finally, when N=1, the overall relative weights are all equal at the average value. Flattening the overall relative weights allows the user to reduce the degree of contrast between the overall relative weights of the sublevel criteria. Correspondingly, profile flattening module 94 provides a useful graphical representation to assist the user in determining which flattening factor "N" to use.

Figure 10:
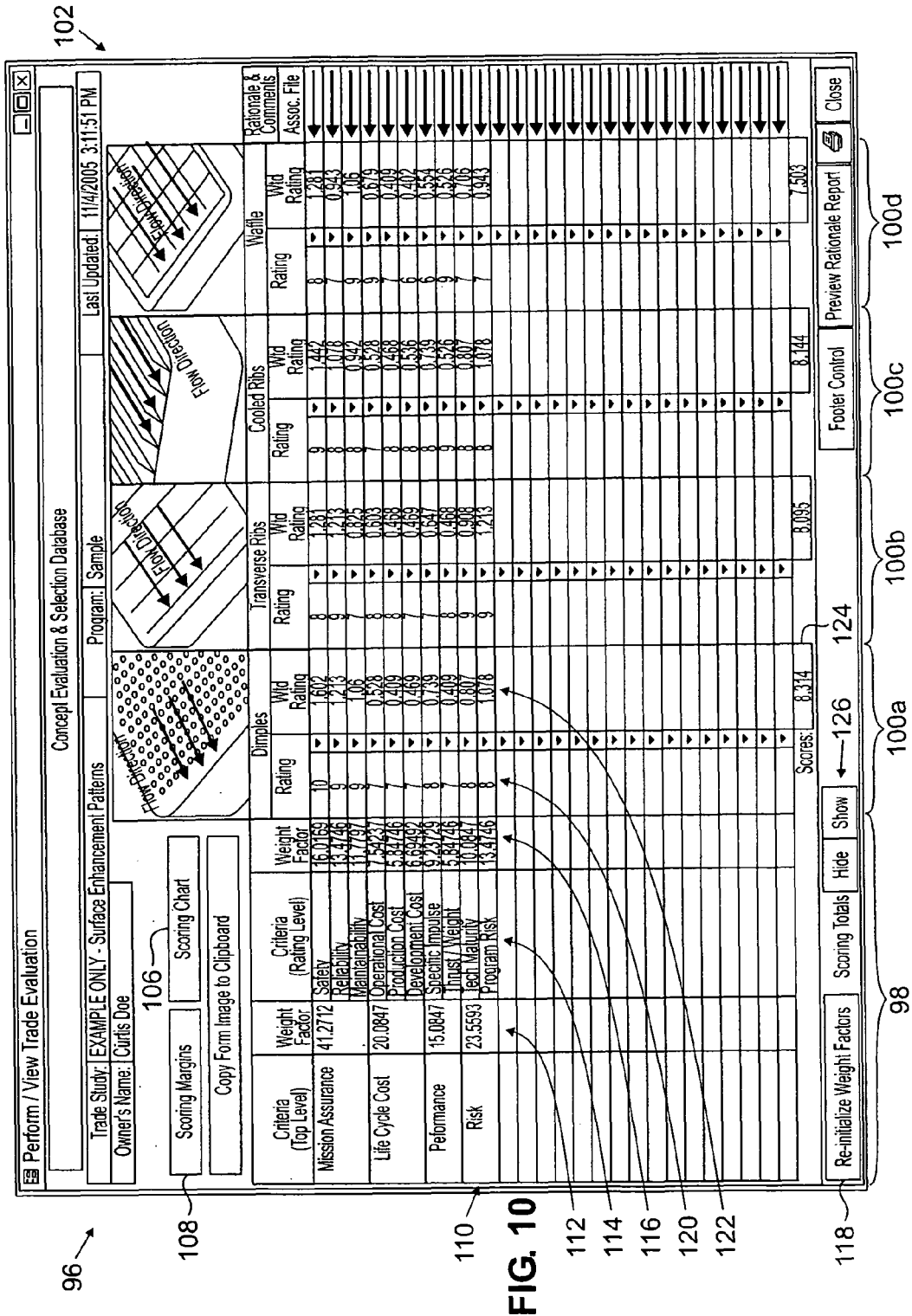

FIG. 10 shows trade evaluation module 96, which is a display module that opens when the user selects trade evaluation button 40 on introduction module 24. Trade evaluation module 96 includes evaluation criteria section 98, alternative candidates sections 100a-100d, comment buttons 102, scoring chart button 106, and scoring margins button 108.

Evaluation criteria section 98 includes top level criteria list 110, top level weight factor list 112, sublevel criteria list 114, sublevel weight factor list 116, and re-initialize button 118. Top level criteria list 10 is a generated list of the top level criteria entered by the user in top level criteria menu 48 of criteria selection module 32 (shown above in FIG. 4). Similarly, sublevel criteria list 114 is a generated list of the sublevel criteria entered by the user in sublevel criteria menu 50 of criteria selection module 32. As discussed above, the sublevel criteria are listed as "rating level criteria" because the sublevel criteria are the criteria that are rated by the participants while evaluating the alternative candidates.

Sublevel weight factor list 116 is a list corresponding to the adjusted overall relative weight values provided in adjusted percentage list 84 of weight factor module 66 (shown above in FIG. 7). Top level weight factor list 112 provides the overall relative weights of the top level criteria. The overall relative weight for each top level criteria is the sum of the overall relative weights of the correspondingly sublevel criteria, which are listed in sublevel weight factor list 116. For example, top level criteria "Risk", which is provided in top level criteria list 110, has an overall relative weight (i.e., 23.6), which is the sum of the corresponding sublevel adjusted overall relative weights (i.e., 10.1+13.5) provided in sublevel weight factor list 116.

The user may also manually modify the adjusted overall relative weights in sublevel weight factor list 116 by entering a new value in the respective location. Thus, CESD program 22 provides a level of personal manipulation to the generated data if the user believes one or more of the generated results are inaccurate. The user may select re-initialize button 18 to reset the adjusted overall relative weights back to the default generated values.

Alternative candidate sections 100a-100d provide information relating to the alternative candidates of the trade study. The following discussion will refer to alternative candidate section 100a, with the understanding that the discussion may apply equally to each of alternative candidate sections 100a-100d. Alternative candidate section 100a includes evaluation value menu 120, weighted rating list 122, and total score box 124. Evaluation value menu 120 is a pull-down menu that allows the user to enter evaluation values of the sublevel criteria for the candidate listed in alternative candidate section 100a (i.e., "Dimples"), pursuant to step 18 of method 10. As generally shown, the evaluation values are provided as numerical values ranging from 1 to 10.

Weighted rating list 122 is a generated list of weighted ratings based on the adjusted overall relative rankings provided in rating level weight factor list 116 and the evaluation values provided in evaluation value menu 120. In this example, each of the weighted ratings are calculated by multiplying adjusted overall relative rankings (of list 116) by the evaluation values (of menu 120), and dividing the product by 100.

Total score box 124 provides the sums of the weighted ratings listed in weighted rating list 122. These scores are representative of a relative ranking of the alternative candidates, pursuant to step 20 of method 10. Based on the values provided in total score box 124 of each of alternative candidate sections 100a-100d, the user may base a decision as to which candidate to pick. By default, the value in total score box 124 is hidden to prevent user bias from affecting the trade study results. In such case, total score box 124 would be blank. However, the user may toggle scoring totals button 126 (shown at the bottom of evaluation module 96) to display the sums of the weighted ratings (as shown in FIG. 10).

Comments buttons 102 allows the user to enter comments and information regarding the alternative candidates, the evaluation criteria (i.e., the top level criteria and the sublevel criteria), and the trade study in general. As discussed below, selecting comments button 102 opens a display module for this purpose. Scoring chart button 106 and scoring margins button 108 also open additional display modules for allowing the user to further analyze the results provided in trade evaluation module 96.

FIG. 11 shows comment module 128, which is a display module that opens when the user selects comments button 102 on trade evaluation module 96. Comment module 128 allows the user to enter comments relating to the alternative candidates and the evaluation criteria. For example, the user may enter details regarding the specific rationales for selecting between different alternative candidates, and may provide general comments about the trade study. Additionally, the user may attach relevant files relating to the trade study, such as white papers and test data. Such information provides a record to support the resulting decision from the trade study.

Figure 12:
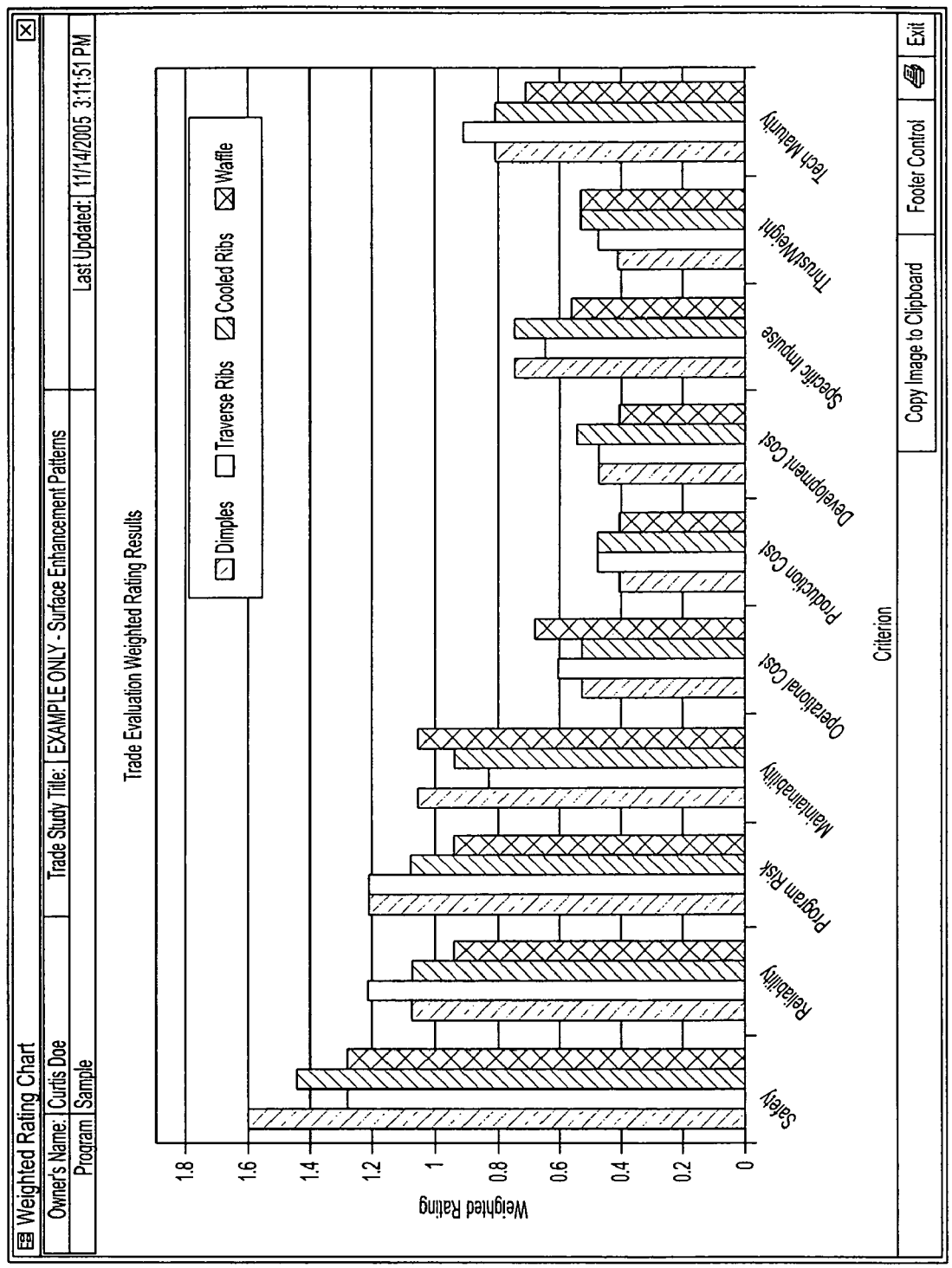

FIG. 12 shows scoring chart module 130, which is a display module that opens when the user selects scoring chart button 106 on trade evaluation module 96. Scoring chart module 130 provides a graphical representation of the weighted ratings of the evaluation criteria for each of the alternative candidates (e.g., the weighted ratings provided in weighted rating list 122). The graphical representation may be used to further assist the user in choosing between the alternative candidates.

FIG. 13 shows scoring margins module 132, which is a display module that opens when the user selects scoring margins button 108 on trade evaluation module 96. Scoring margins module 132 provides comparative charts that also assist the user in comparing the alternative candidates. Scoring margins module 132 includes evaluation criteria list 134, margin-over-least chart 136, and margin-over-all chart 138. Evaluation criteria list 134 is a generated list of the sublevel criteria and corresponding overall relative weights as previously listed in sublevel criteria list 114 and sublevel weight factor list 116 of trade evaluation module 96 (shown above in FIG. 10).

Margin-over-least chart 136 displays each of the weighted rating results for a sublevel criteria versus the lowest value of the given sublevel criteria. For example, with respect to the sublevel criteria entitled "Thrust/Weight", the lowest weight rating result was recorded for the "Dimples" candidate (i.e., a value of 0.409, as shown above in FIG. 10). As such, the corresponding cell in margin-over-least chart 136 is blank, and the results of "Thrust/Weight" for the other three alternative candidates are expressed as the difference between the given values and the value for the "Dimples" candidate (e.g., for the "Transverse Ribs" candidate, which had a weighted rating result of 0.468, 0.468×0.409=0.059). This allows the user to evaluate and compare the how much better the alternative candidates are relative to the lowest candidate for each sublevel criteria.

Similarly, margin-over-all chart 138 displays the difference between the highest weighted rating result for a given sublevel criteria and the second highest value. For example, with respect to the sublevel criteria entitled "Safety", the "Waffle" candidate had the highest weight rating result of 1.602, and the "Cooled Ribs" candidate had the second highest weight rating result of 1.442. Therefore, margin-over-all chart 138 shows the "Waffle" candidate having a margin of 0.160 (i.e., 1.602×1.442=0.160). The remaining cells are for "Safety" are correspondingly blank. Margin-over-all chart 138 allows the user to compare the magnitudes of the highest ranking candidates for a given sublevel criteria to further assist the decision-making process.

As discussed above, CESD program 22 is a user-friendly software program for conducting trade studies pursuant to method 10 of the present invention. CESD program 22 reduces the risk of user bias, and provides a detailed record of all entered data. The results of a trade study conducted with CESD program 22 may then be presented along with the detailed record to provide a complete explanation of the rationale used in the decision-making process.

Figure 14:
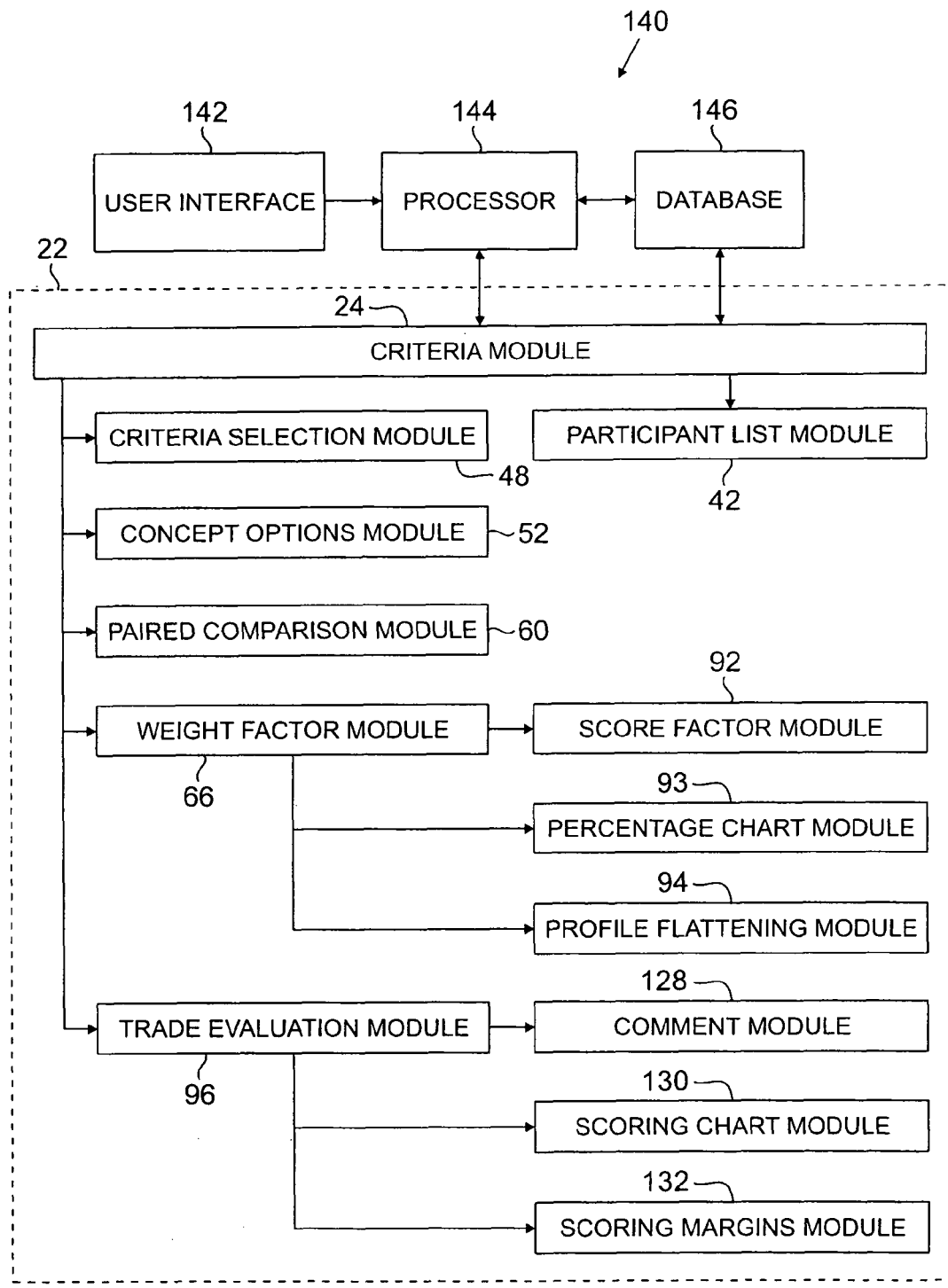
FIG. 14 is a block diagram of a computer-based system for operating the computer program to conduct trade studies pursuant to the method of the present invention.

FIG. 14 is a block diagram of system 140, which is a suitable computer-based system for operating CESD program 22 to conduct a trade study pursuant to method 10 of the present invention. System 140 includes user interface 142, processor 144, database 146, and CESD program 22. User interface 142 may be any type of interface controls that allow a user to operate system 140, such as keyboards, input pads, display monitors, and the like. Processor 144 is a computer processor configured to communicate with user interface 142 and database 146, while operating CESD program 22. Database 146 is a data storage system for retaining records of the information entered into CESD program 22.

As discussed above in FIGS. 2-13, CESD program 22 includes various user-friendly display modules that allow the user to enter information for conducting a trade study. A user may conduct a trade study with system 140 by running CESD program 22 via user interface 142. CESD program 22 is loaded into the memory (not shown) of system 140, and communicates with processor 144 to receive and generate data for conducting the trade study. Processor 144 may also store data that is received and generated by CESD program 22 in database 146 for subsequent access. System 140 is beneficial for reducing the amount of work the user must undertake, and provides a convenient arrangement for subsequently providing documentation of the trade study conducted.

Although the present invention has been described with reference to preferred embodiments, workers skilled in the art will recognize that changes may be made in form and detail without departing from the spirit and scope of the invention.

The invention claimed is:

1. A method for performing a comparative evaluation of a plurality of alternative candidates in a trade study, the method comprising a computer performing the steps of:
   receiving a plurality of evaluation criteria for evaluating the alternative candidates;
   comparing pairs of the evaluation criteria, receiving relative weight associated with each compared pair of evaluation criteria, and calculating in response to the received relative weights an overall relative weight associated with each evaluation criteria;
   calculating an average overall relative weight;
   calculating an adjusted overall relative weight for at least one of the evaluation criteria as a function of the average overall relative weight and a flattening factor, wherein the flattening factor "N" is a real value ranging from 0 to 1;
   receiving an assigned evaluation value associated with each of the evaluation criteria for each of the alternative candidates;
   calculating a weighted rating for each evaluation criteria based on the assigned evaluation value and adjusted overall relative weight assigned each evaluation criteria;
   calculating a relative ranking of the alternative candidates by summing the weighted ratings calculated for each evaluation criteria; and
   displaying the relative ranking of the alternative candidates to a user.

2. The method of claim 1, wherein receiving the plurality of evaluation criteria comprises:
   receiving a plurality of top level criteria for evaluating the plurality of alternative candidates; and
   receiving at least one sublevel criteria for each of the top level criteria.

3. The method of claim 1, wherein comparing pairs of the evaluation criteria comprises a paired comparison of the evaluation criteria.

4. The method of claim 1, further comprising evaluating each of the alternative candidates.

5. The method of claim 1, wherein the function for calculating the adjusted overall relative weight comprises:

$$\text{adjusted overall relative weight} = [(\text{Average \%} - \text{Raw \%}) \times N] + \text{Raw \%}$$

wherein "Average %" is the average overall relative weight, "N" is the flattening factor, and "Raw %" is a relative weight percent of the at least one sublevel criteria based on the relative weight assigned to the at least one sublevel criteria.

6. A user-operated computer program embodied on a non-transitory computer readable medium, the program executed by a processor to implement a system for performing a comparative evaluation of a plurality of alternative candidates in a trade study, the executed computer program comprising:
   a criteria selection module configured to receive criteria information for creating a plurality of evaluation criteria for evaluating the alternative candidates;
   a paired comparison module configured to receive the evaluation criteria from the criteria selection module, and further configured to receive relative weight information for assigning a relative weight to compared pairs of evaluation criteria;
   a weight factor module configured to generate overall relative weights for the evaluation criteria, wherein the weight factor module is further configured to adjust the overall relative weights based on a calculated average overall relative weight and a flattening factor to generate an adjusted overall relative weight, wherein the flattening factor "N" is a real value ranging from 0 to 1; and
   a trade evaluation module configured to receive evaluation information for assigning an evaluation value to each evaluation criteria for each of the plurality of alternative candidates, and further configured to calculate a weighted rating for each evaluation criteria based on the assigned evaluation value and adjusted overall relative weight assigned each evaluation criteria, wherein the trade evaluation module displays a relative ranking of the alternative candidates based on a sum of the weighted ratings for each evaluation criteria.

7. The computer program of claim 6, wherein the plurality of evaluation criteria created with the criteria selection module comprises:
   a plurality of top level criteria for evaluating the plurality of alternative candidates; and
   at least one sublevel criteria for each of the top level criteria.

8. The computer program of claim 6, further comprising a display module configured to provide a first graphical representation of the overall relative weights and a second graphical representation of the adjusted overall relative weights.

9. The computer program of claim 6, further comprising a display module configured to receive information about the alternative candidates and to generate an information record of the alternative candidates based at least in part on the received information.

10. The computer program of claim 6, further comprising a display module configured to display the relative ranking in an arrangement selected from the group consisting of a margin-over-least arrangement, a margin-over-all arrangement, and a combination thereof.

11. A computer system comprising:
   a user interface configured to allow a user to enter information into the computer system;
   a processor configured to communicate with the user interface;
   a database configured to communicate with the processor for storing data;
   a program configured to communicate with the processor for performing a comparative evaluation of a plurality of alternative candidates in a trade study, the program comprising:
      a criteria selection module configured to receive criteria information from the user interface for creating a plurality of evaluation criteria for evaluating the alternative candidates;
      a paired comparison module configured to receive the evaluation criteria from the criteria selection module, and further configured to receive relative weight information from the user interface for assigning a relative weight to compared pairs of evaluation criteria;
      a weight factor module configured to generate overall relative weights for the evaluation criteria, wherein the weight factor module is further configured to calculate an average overall relative weight and adjust the overall relative weights based at least in part on the calculated average overall relative weight and a flattening factor that is a real value ranging from 0 to 1, and wherein the relative ranking is based at least in part on the adjusted overall relative weights; and
      a trade evaluation module configured to receive evaluation information from the user interface for assigning an evaluation value to each evaluation criteria for each of the plurality of alternative candidates, and further configured to calculate a weighted rating for each evaluation criteria based on the assigned evaluation value and adjusted overall relative weight assigned each evaluation criteria, wherein the trade evaluation module displays a relative ranking of the alternative candidates based on a sum of the weighted ratings for each evaluation criteria.

12. The computer system of claim 11, wherein the plurality of evaluation criteria created with the criteria selection module comprises:
   a plurality of top level criteria for evaluating the plurality of alternative candidates; and
   at least one sublevel criteria for each of the top level criteria.

13. The computer system of claim 11, wherein the program further comprises a display module configured to display the relative ranking in an arrangement selected from the group consisting of a margin-over-least arrangement, a margin-over-all arrangement, and a combination thereof.

* * * * *